S. D. AND R. D. MARR.
STEERING WHEEL LOCK.
APPLICATION FILED DEC. 10, 1919.
1,381,726. Patented June 14, 1921.
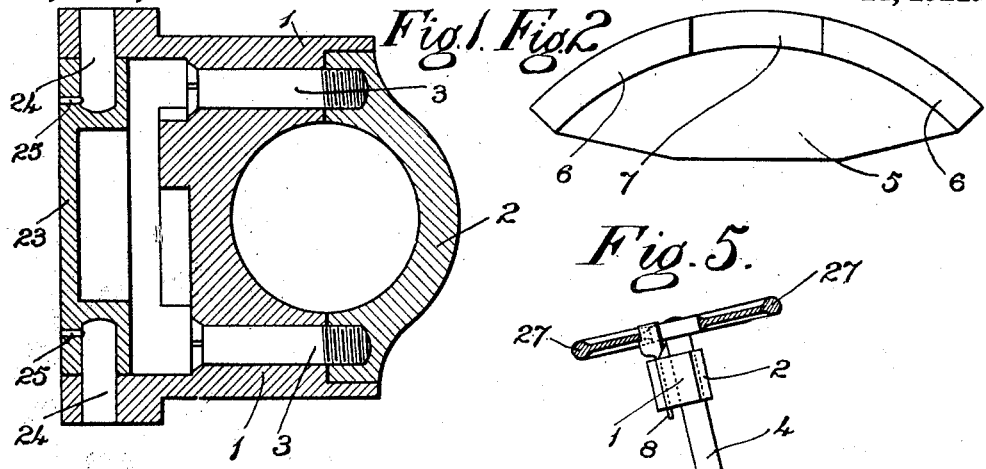
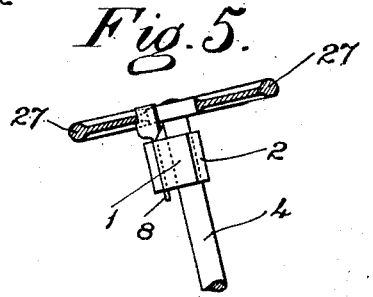
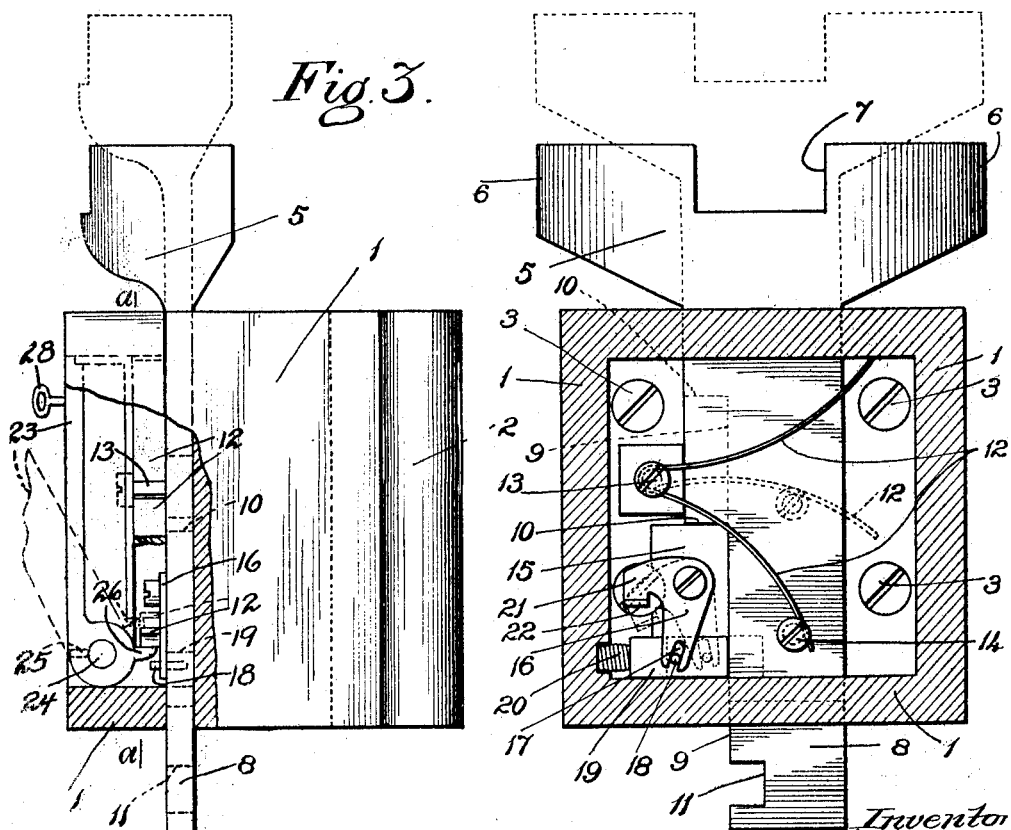
Inventors
Stuart D. Marr
Robert D. Marr

UNITED STATES PATENT OFFICE.

STUART DUNCAN MARR AND ROBERT DUCKETT MARR, OF BALHAM, LONDON, ENGLAND.

STEERING-WHEEL LOCK.

1,381,726.  Specification of Letters Patent.  Patented June 14, 1921.

Application filed December 10, 1919. Serial No. 343,883.

*To all whom it may concern:*

Be it known that we, STUART DUNCAN MARR and ROBERT DUCKETT MARR, subjects of the King of Great Britain, residing at Balham, London, England, have invented certain new and useful Improvements in Steering-Wheel Locks, of which the following is a specification.

The object of this invention is to construct an appliance for locking the steering wheels of road motor vehicles to prevent such vehicles being stolen, the appliance being affixed to or formed with the steering column and having a member capable of engaging the spokes or arms or the boss of the steering wheel and being locked in that position so as to prevent the steering of the vehicle.

For the purpose of our invention we construct a box like appliance affixable to or formed with the steering column, such box containing one end of a member adapted to engage some of the spokes or arms or the boss of the steering wheel or the controls when the steering column revolves. When the controls and steering column revolve such member may engage a clip or device on the dashboard or other part of the vehicle, the member being locked in place while engaging the steering wheel or other part and being capable of release either automatically or by hand after operation of a device capable of preventing access to the member or allowing access thereto.

Our invention will be clearly understood from the following description aided by the annexed drawings in which—

Figure 1 is a horizontal section of the casing or box and door but not showing the operable parts.

Fig. 2 is a plan view of the locking member.

Fig. 3 is a side elevation of a complete device with parts broken away to show the door in closed position.

Fig. 4 is a section on the line *a a* of Fig. 3 when viewed from the left Fig. 1.

Fig. 5 is a view partly in section and partly in elevation of a steering wheel and column having our appliance attached thereto, the steering wheel being shown in locked position and the steering column being shown as of the fixed type.

In simple form and as shown our appliance is constructed as follows:

We form a box like device 1, to one side of which we secure a clip 2 the screws 3, 3 utilized for this purpose being applied inside the box 1 and do not extend outside the clip, as shown in Fig. 1. The box end and the clip are so shaped as to encircle the steering column 4 and the screws 3 causing the box 1 and clip 2 to grip the steering column 4 but such box 1 may form part of the steering column if so desired.

We construct a bolt or lever member 5 somewhat of T shape the arms 6, 6 being curved and having a slot or groove 7 cut at about the center of the upper edge while the leg 8 is formed with a cut away portion 9 forming a ledge 10 on one side, and a recess 11 is formed near the bottom of the leg 8.

The arms 6 project outside the box 1 and the leg 8 is positioned within it and also passes through the bottom of the box as shown in Figs. 3 and 4.

The T member is controlled and normally held in lowered or unlocked position by a spring 12 secured to the box 1 by a screw 13 and acting between a wall of the box 1 and a screw 14 on the leg 8.

Inside the box we position a stop 15 which engages the ledge 10 of the T member 5 to limit the lowering movement of the latter and to this stop 15 we pivot a bent or L shaped lever 16, one arm of which is provided with a slot 17 engaging a pin 18 on a sliding piece 19. The sliding piece 19 is acted upon by a spring 20 to normally press the sliding piece 19 toward the leg 8 of the T member 5, while the other arm 21 of the L lever 16 has a right angled projection 22.

A door 23 is pivoted to the bottom or one end of the box 1, the pivots 24, 24 being so constructed and applied that they cannot be removed from outside the box by any ordinary tool. In the present instance they are shown as held in place by grub pins 25, 25, the pins having their ends flush with the outside of the box, and the door 23 is provided with a nose 26 which, during the opening movement of the door, acts upon the right angled extension 22 on the L lever and rocks same thus acting upon the sliding piece 19. The door is provided with a lock, operated by a key 28, to lock it and prevent access to the T member 5 except by the proper key or secret means.

When the T member 5 is lowered the steering wheel is free the spring controlling means 12 holding it free, while the sliding piece 19 normally presses against the leg 8 of the T member 5. Now to lock the steering wheel as shown in Fig. 5, the T piece 5 is lifted in order that the arms 6 may engage the boss of the wheel with the slot or groove 7 embracing one arm or spoke while the arms 6 will engage the arms or spokes on each side. In this position the spring 20 will push the sliding piece 19 into the recess 11 in the leg 8 of the T member 5 so as to hold the T member in raised position and lock the steering wheel 27, the door being held locked during this movement. To release the T member 5 from the steering wheel 27 the door 23 is opened and during its opening movement its nose will act upon the right angled extension 22 of the L lever, rock same about its pivot and withdraw the sliding piece 19 from the recess 11 in the leg 8 of the T member 5. The spring 12 will then lower the T member 5 until the shoulder 10 on the leg 8 engages the stop 15 when the steering wheel 27 will be free.

What we do claim as our invention and desire to secure by Letters Patent, is:—

1. An appliance for locking the steering wheels of motor vehicles comprising a casing associated with the steering column of the vehicle, a locking member movably mounted within the casing and adapted to engage the steering wheel, means for locking the movable member when it is in engagement with the steering wheel, a door pivoted to said casing and adapted when in closed position to conceal said locking member and locking means, said door having means acting when it is being opened to release the locking member from engagement with the steering wheel, and means for locking the door in closed position.

2. An appliance for locking the steering wheels of motor vehicles consisting of a casing associated with the steering column of a vehicle, a vertically movable bolt member adapted to engage the steering wheel, said bolt member being formed with a shouldered leg portion within said casing and having a cutaway portion and a recess therein, a spring mounted within the casing and bearing upon and controlling the bolt member, a ledge within the casing against which the shoulder of the leg portion is adapted to abut, a sliding spring-controlled member in the casing adapted to engage the recessed portion of the bolt member, a pin projecting from said sliding member, an L-shaped lever pivoted in the casing, one end of said lever being in engagement with the pin on the sliding member and the other end formed with an angle projection, a door pivoted to the casing and adapted to close one side thereof and formed with a nose piece positioned to engage said angle projection and thereby operate the L-lever upon opening movement of the door, and means for locking said door in closed position.

3. A device for locking the steering wheel of a vehicle comprising a casing, a door hinged in said casing, means for attaching said casing to the steering column of the vehicle, a bolt member mounted in said casing, said bolt member being adapted in raised position to engage the steering wheel, a spring for normally maintaining said bolt in lowered position, a sliding member for locking said bolt in elevated position, a lever adapted to control the movement of said sliding member, means carried by said door and by said lever to release said sliding member from locking engagement with the bolt when the door is opened, and means for locking the door in closed position.

In testimony whereof we have hereunto set our hands in presence of two subscribing witnesses:

STUART DUNCAN MARR.
ROBERT DUCKETT MARR.

Witnesses:
PERCY E. MATTOCKS,
H. MAYKELS.